Patented Dec. 19, 1944

2,365,493

UNITED STATES PATENT OFFICE 2,365,493

PURIFICATION OF p-PHENETIDINE

Clarence Leonard Richardson, Jr., Carneys Point, N. J., assignor to E. I. du Pont de Nemours & Company, Wilmington, Del., a corporation of Delaware No Drawing. Application August 7, 1942, Serial No. 454,075

5 Claims. (Cl. 260—575)

This invention relates to the purification of crude p-phenetidine and more particularly to the preparation of a special grade of purified paraphenetidine particularly adapted for the manufacture of U. S. P. XI grade of "Phenacetin" (N-acetyl-p-phenetidine).

One of the U. S. Pharmacopoeia XI tests specifies that 0.3 grams of "Phenacetin" when boiled with 1 drop of 0.1 N iodine solution, 1 cc. of alcohol and 3 cc. of water shall not develop a pink color. This test is designed to detect the presence of unacetylated para-phenetidine. However, I have found that certain other impurities, normally present in commercial paraphenetidine, develop the same pink color in such test and are extremely difficult to remove from either the phenetidine or the "Phenacetin" by usual methods. Not much is known about the nature of such impurities. They appear to be formed when either crude or highly purified para-nitro-phenetole is reduced (1) with iron and acid, (2) with sulfides, sulfhydrates, etc., or (3) by catalytic hydrogenation, though in the two former types of reductions they appear to be formed to a very much smaller extent. The impurities, produced by side reactions during catalytic hydrogenations, cannot be completely removed by fractional distillation. Such impurities are also extremely difficult to remove from the acetylated product. Often, three or four crystallizations from water, alcohol or other solvents are necessary before satisfactory "Phenacetin" is obtained. Such crystallizations result in poor yields. When the phenetidine is purified, prior to conversion to "Phenacetin," by one or more crystallizations from water as the salt of some inorganic acid with subsequent basing, separation and distillation of the product, the yields are poor, the material and labor costs are high and there is extensive corrosion of the equipment.

It is an object of the present invention to provide a new and improved method for purifying crude p-phenetidine to obtain a product which is satisfactory for use in the manufacture of U. S. P. XI "Phenacetin." Another object is to provide an economical and commercially feasible process for purifying crude p-phenetidine. Further objects are to advance the art. Still other objects will appear hereinafter.

The above and other objects may be accomplished in accordance with my invention which comprises mixing the crude p-phenetidine with an inert finely divided solid adsorbent material, heating for a substantial period of time to cause the adsorbent material to adsorb a substantial proportion of the impurities associated with the p-phenetidine, cooling the mixture to a temperature at which it can be conveniently filtered, filtering the adsorbent material, together with the impurities adsorbed thereon, adding to the filtrate a solution of an alkaline sulfide, heating for a period of time to cause the alkaline sulfide to act on impurities so as to place such impurities in a form where they will not readily distill with p-phenetidine and then distilling, preferably in the presence of hydrogen sulfide, to recover the purified p-phenetidine. By such process, I am able to obtain high yields of highly purified p-phenetidine which is particularly adapted and satisfactory for the manufacture of U. S. P. XI grade of "Phenacetin." Such process is economical and has proved to be highly satisfactory for use on a commercial scale.

Many and varied selective adsorbent materials are known which are very satisfactory for use in the adsorption step of my process. Representative of such adsorbents are activated talc, activated aluminum oxide, kieselguhr, activated kaolin, infusorial earth, vegetable charcoals, animal charcoals, diatomaceous earth and certain crude mica-like materials. The activity of such selective adsorbents may be enhanced by impregnation thereof with finely divided reduced nickel.

As is usual in liquid phase adsorption processes, the adsorbent should be finely divided. The adsorbent is added to the p-phenetidine in a small proportion sufficient in amount to adsorb a substantial proportion of the impurities present in the p-phenetidine. The amount employed will depend upon the particular adsorbent and its degree of activity and on the extent of the impurities present in the p-phenetidine. Usually, the adsorbent will be employed in the proportion of from about 1% to about 10% based on the weight of the p-phenetidine. As little as 0.1% of the adsorbent may be used, but such amounts occasionally give erratic results and are not preferred. Larger amounts of adsorbent may be employed if desired. However, very large amounts of adsorbent on the order of 50% or more will usually so increase the costs, difficulties in handling, etc., that the process may become uneconomical. It is sometimes possible to remove all of the impurities by adsorption alone, employing repeated adsorption treatments or larger amounts of a suitable adsorbent. However, in this latter case, the recoveries of purified p-phenetidine are lower and the added labor involved in cleaning filter presses, etc., is appreciable.

The temperatures and the time of heating in the adsorption step will depend largely upon the activity of the adsorbent and also on the nature and extent of the impurities present in the crude p-phenetidine. The temperatures may vary from about 60° C. to about 250° C. When the more active adsorbents, such as activated talc, nickel on kieselguhr, and the like, are employed, the temperatures will usually be form about 60° C. to about 150° C. and preferably at from about 100° C. to about 125° C. On the other hand, when the less active adsorbents are employed and it is desired to obtain simultaneous activation of the adsorbent and adsorption of the impurities, as in the case of aluminum oxide, it will usually be desirable to employ temperatures of from about 175° C. to about 250° C. and preferably at about 200° C. to about 225° C.

The alkaline sulfides, which may be employed for purifying crude p-phenetidine in accordance with the process of my invention, comprise the sulfhydrates or hydrosulfides, sulfides and polysulfides of ammonia, the alkali metals and the alkaline earth metals, such as the sodium, potassium, ammonium and calcium sulfhydrates, sulfides and polysulfides. Alkaline sulfides which have proved to be particularly satisfactory are Na$_2$S, (NH$_4$)$_2$S$_{1.9}$, NaSH, Na$_2$S$_{1.1}$, Na$_2$S$_{2.1}$ and Na$_2$S$_{3.5}$. The alkaline earth compounds appear to be somewhat less effective than the others.

The alkaline sulfides will generally be employed as solutions in suitable solvents, such as water and the lower aliphatic alcohols, such as methanol and ethanol. They have been employed successfully as dilute alcoholic solutions, but I preferably employ them as aqueous solutions. The concentrations of the solutions of the alkali sulfides may be varied substantially as desired. I have successfully employed solutions containing as little as 5% of sodium sulfide and sodium sulfhydrate and solutions containing as high as about 35% of the alkaline sulfide. The concentration may vary from about 5% concentration up to the limit of solubility of the alkaline sulfide in the solvent. Preferably, when the alkaline sulfide is that of ammonia or an alkali metal, I employ solutions having a concentration of from about 20% to about 35% of the alkaline sulfide. When the alkaline earth metal sulfides are employed, I preferably employ them in a concentration of from about 5% to about 10%.

The amount of the alkaline sulfide employed will depend largely on the nature and amount of impurities in the p-phenetidine being treated. It is usually desirable to employ slightly more than that which is considered to be essential for the particular batch of p-phenetidine. It will usually be desirable to employ at least 0.1% of the alkaline sulfide, based on the weight of the p-phenetidine. Preferably, I employ from about 1% to about 3% of alkaline sulfide on the weight of the p-phenetidine. Much larger amounts of the alkaline sulfide may be employed as desired, but excessive amounts do not affect the quality of the product, but do tend to increase the costs and labor involved.

The p-phenetidine should be heated with the alkaline sulfide for a substantial period of time so as to cause the alkaline sulfide to act on the impurities. The temperatures employed may vary from about 60° C. to about 150° C. or higher, if desired. However, no substantial advantage will usually be gained by employing temperatures substantially above 150° C. Usually, I employ temperatures of from about 85° C. to about 125° C. and particularly the reflux temperature of the mixture. The reflux temperature of the mixture will naturally vary with the character of the ingredients of the mixture and the relative amounts thereof. Where the reflux temperature of the mixture tends to be inconveniently high, it is usually desirable to add to the mixture a small proportion of an inert volatile diluent, such as methanol, ethanol, cellosolve, toluene, benzene and the like. Up to about 30% of the diluent, based on the crude p-phenetidine, has been found to be quite satisfactory. Larger amounts may be employed, if desired, but excessive amounts naturally reduce the capacity of the equipment and prolong the distillation. Preferably, I employ from about 10% to about 15% of a volatile diluent such as toluene. By suitably controlling the reflux temperature to within a range which can be conveniently attained and heating the mixture to such reflux temperature, I am able to obtain better action of the alkaline sulfide on the impurities.

After the reaction of the alkaline sulfide on the impurities has progressed to the desired extent, the mixture is subjected to fractional distillation to recover the purified p-phenetidine. The solvent and the volatile diluent, when employed, are first distilled off and then, as the distillation continues, p-phenetidine comes off. It is sometimes possible to continue the distillation until only inorganic salts and tar remain in the still, constituting a residue of about 1% to about 2%. Generally, it is desirable to terminate the distillation before all of the p-phenetidine has been distilled off so as to avoid contamination of the p-phenetidine. Usually, I prefer to leave a residue of about 3% to about 7% in the still and maintain it separate from the main fraction. By the term "wet forerun" as employed herein, I mean the first portion of the distillate which comprises both p-phenetidine and water or other solvent in visible amounts.

The distillations may be carried out at atmospheric pressure or under vacuum. I generally prefer to carry out the distillation under a vacuum of about 10 to about 20 mm. of mercury so as to avoid unnecessarily high temperatures. I also preferably carry out the distillation in the presence of hydrogen sulfide which appears to prevent decomposition and oxidation of the p-phenetidine with the production of undesirable impurities. In some cases, it is possible to distill successfully in the presence of oxygen and in the absence of hydrogen sulfide to obtain satisfactory p-phenetidine. In other cases, satisfactory p-phenetidine cannot be obtained under such circumstances. It is generally preferred to distill in the absence of air or oxygen, even when hydrogen sulfide is employed, although satisfactory results are generally obtained when air is present with the hydrogen sulfide.

It is not essential that the sulfide treatment and distillation follow the adsorption treatment, as the adsorption treatment may be applied after the sulfide treatment and distillation. Also, it is occasionally possible to purify crude p-phenetidine to obtain purified material satisfactory for making U. S. P. XI "Phenacetin" by employing the alkaline sulfide treatment and distillation without the adsorption step. However, in this latter case, the results are erratic and the quality of the product is never so good as when both the adsorption and the alkaline sulfide treatments are employed.

In order to more clearly illustrate my invention, the preferred modes of carrying the same into effect and the advantageous results to be obtained thereby, the following examples are given, wherein the parts are by weight:

Example I

Activate 20 parts of finely divided talc by heating for about four hours under vacuum at 200° C. or higher. Cool under vacuum and suck in 200 parts of crude para-phenetidine. Heat two hours at 60-150° C., cool and filter, but do not suck dry or wash the residue. Add 20 parts of methanol and 10 parts of 20% aqueous sodium sulfide solution to the filtrate and reflux for six hours or longer. Distill the charge in an atmosphere of hydrogen sulfide, separating a wet forerun and leaving about a 5% residue in the still. The main fraction, 170 parts, is satisfactory for the preparation of U. S. P. XI grade of "Phenacetin."

Example II

Add 10 parts of aluminum oxide (200 mesh) to 200 parts of crude p-phenetidine. Heat 200° C. for 4 hours to effect simultaneous activation and adsorption. Cool and filter. (If recovery of the phenetidine in the residue is carried out by solvent extractions, or other known methods, it must be kept separate from the main portion of the filtrate as it is too badly contaminated for use in the manufacture of U. S. P. XI grade of "Phenacetin.") Add 5 to 20 parts of a 20% to 30% aqueous solution of ammonium polysulfide, for example $(NH_4)_2S_{1.9}$, and reflux for 12 hours. Distill out the water and collect the p-phenetidine by distillation in a tight still, preferably in an atmosphere of hydrogen sulfide. Yield: 175 parts of p-phenetidine suitable for the manufacture of U. S. P. grade "Phenacetin.")

In the above examples, the distillation was carried out at atmospheric pressures. However, vacuum distillation may be satisfactorily substituted therefor.

Example III

After catalytic hydrogenation of p-nitrophenetol, using 1% to 3% of a reduced nickel on kieselguhr catalyst, such as is described in the Journal of the American Chemical Society 54, 1651 (1932), filter off the spent catalyst. Do not wash the residue or suck it dry, as certain impurities, adsorbed on the spent catalyst, will contaminate the product. To the filtrate, add about 2% by weight of sodium sulfhydrate which may be used as a 5% to 35% aqueous solution. Add toluene up to 30% by volume. Reflux for about 8 hours. Distill out most of the toluene at atmospheric pressure and then reduce the pressure on the system to 10-15 mm. Hg, passing a stream of hydrogen sulfide through the system during the vacuum distillation. Collect separately the toluene and phenetidine forerun and then the pure phenetidine, leaving about a 5% residue in the still. The yield is 85% to 90% of theory of purified p-phenetidine which is suitable for the manufacture of U. S. P. XI grade "Phenacetin." An additional 7% to 12% of low grade material is recoverable from the catalyst residue and the still residues and such material is satisfactory for uses other than the manufacture of U. S. P. "Phenacetin."

It will be understood that the above examples are given for illustrative purposes only and that many variations and modifications may be made therein, particularly in the materials employed, the proportions thereof, the temperatures, pressures and other details of the procedure without departing from the spirit or scope of my invention. On the other hand, I intend to cover my invention broadly as in the claims appended hereto.

From the foregoing description of my invention, it will be apparent that I have provided an improved method of purifying crude p-phenetidine so as to obtain a purified product of such character that it is satisfactory for the manufacture of U. S. P. XI grade of "Phenacetin." By such process, the purified p-phenetidine is consistently obtained in high yields. The process involves a short adsorption period, a filtration, a short reflux period and a vacuum distillation. The labor required to operate the process is small. Also, the materials costs are small. Accordingly, the process is one which is simple and economical to operate on a commercial scale.

I claim:

1. In a process for purifying crude p-phenetidine, obtained by the catalytic hydrogenation of para-nitro-phenetole, the steps which comprise heating the crude p-phenetidine in admixture with from about 1% to about 10% of an inert finely divided solid activated adsorbent material at a temperature of from about 60° C. to about 250° C., filtering out the adsorbent and the adsorbed impurities, adding a solution of 0.1% to about 3% of an alkaline sulfide, based on the p-phenetidine, heating at a temperature of from about 85° C. to about 125° C. for several hours and then distilling in the presence of hydrogen sulfide to recover purified p-phenetidine.

2. In a process for purifying crude p-phenetidine, obtained by the catalytic hydrogenation of para-nitro-phenetole, the steps which comprise heating the crude p-phenetidine in admixture with from about 1% to about 10% of an inert finely divided solid activated adsorbent material at a temperature of from about 60° C. to about 250° C., filtering out the adsorbent and the adsorbed impurities, adding an aqueous solution of 0.1% to about 3% of a sodium sulfide, based on the p-phenetidine, and a small proportion of an inert volatile diluent, having a boiling point below that of the aqueous solution of the sodium sulfide, heating at reflux for several hours and then distilling in the presence of hydrogen sulfide to recover purified p-phenetidine.

3. In a process for purifying crude p-phenetidine, obtained by the catalytic hydrogenation of para-nitro-phenetole, the steps which comprise heating the crude p-phenetidine in admixture with from about 1% to about 10% of an inert finely divided solid activated adsorbent material at a temperature of from about 60° C. to about 250° C., filtering out the adsorbent and the adsorbed impurities, adding an aqueous solution of 0.1% to about 3% of an alkali metal sulfide, based on the p-phenetidine, and a small proportion of an inert volatile diluent, having a boiling point below that of the aqueous solution of alkali sulfide, heating at reflux for several hours and then distilling in the presence of hydrogen sulfide to recover purified p-phenetidine.

4. In a process for purifying crude p-phenetidine, obtained by the catalytic hydrogenation of para-nitro-phenetole, the steps which comprise heating the crude p-phenetidine in admixture with from about 1% to about 10% of an inert finely divided solid activated adsorbent material at a temperature of from about 60° C. to about 250° C., filtering out the adsorbent and the adsorbed impurities, adding a 5% to 35% aqueous solution of 0.1% to about 3% of sodium sulfhydrate, based on the p-phenetidine, and about 10 to about 15% of toluene, heating at reflux for several hours and then fractionally distilling in an atmosphere of hydrogen sulfide to recover purified p-phenetidine.

5. In a process for purifying crude p-phenetidine, obtained by the catalytic hydrogenation of para-nitro-phenetole, the steps which comprise heating the crude p-phenetidine in admixture with from about 1% to about 10% of an inert finely divided solid activated adsorbent material at a temperature of from about 60° C. to about 250° C., filtering out the adsorbent and the adsorbed impurities, adding a 20% to 30% aqueous solution of .25% to about 3% of ammonium polysulfide, based on the p-phenetidine, heating at reflux for several hours and then distilling in the presence of hydrogen sulfide to recover purified p-phenetidine.

CLARENCE LEONARD RICHARDSON, Jr.